(12) United States Patent
Atkins et al.

(10) Patent No.: US 7,872,982 B2
(45) Date of Patent: Jan. 18, 2011

(54) IMPLEMENTING AN ERROR LOG ANALYSIS MODEL TO FACILITATE FASTER PROBLEM ISOLATION AND REPAIR

(75) Inventors: Mark G. Atkins, Arvada, CO (US); Michal B. Cohen, Mohegan-Lake, NY (US); John W. Doxtader, Hurley, NY (US); Chetan Mehta, Austin, TX (US); Patrick J. Sugrue, Georgetown, TX (US)

(73) Assignee: International Business Machines Corporation, Armonk, NY (US)

( * ) Notice: Subject to any disclaimer, the term of this patent is extended or adjusted under 35 U.S.C. 154(b) by 513 days.

(21) Appl. No.: 11/537,823

(22) Filed: Oct. 2, 2006

(65) Prior Publication Data
US 2008/0080384 A1 Apr. 3, 2008

(51) Int. Cl.
*G01R 31/08* (2006.01)
(52) U.S. Cl. ...................... 370/252; 370/242
(58) Field of Classification Search ............... 370/252; 709/224, 202
See application file for complete search history.

(56) References Cited

U.S. PATENT DOCUMENTS

| | | | |
|---|---|---|---|
| 5,483,637 A | 1/1996 | Winokur et al. | |
| 5,960,381 A | 9/1999 | Singers et al. | |
| 6,058,116 A | 5/2000 | Hiscock et al. | |
| 6,061,723 A * | 5/2000 | Walker et al. | 709/224 |
| 6,078,979 A | 6/2000 | Li et al. | |
| 6,694,361 B1 | 2/2004 | Shah et al. | |
| 6,810,418 B1 | 10/2004 | Shah et al. | |
| 6,836,750 B2 | 12/2004 | Wong et al. | |
| 2002/0116485 A1 * | 8/2002 | Black et al. | 709/223 |
| 2002/0159451 A1 * | 10/2002 | Foster et al. | 370/389 |
| 2003/0063560 A1 * | 4/2003 | Jenq et al. | 370/216 |
| 2004/0015744 A1 | 1/2004 | Klotz et al. | |

OTHER PUBLICATIONS

Clark, Tom. "Designing Storage Area Networks: A Practical Reference for Implementing Fibre Channel and IP SANs" Second Edition. Addison Wesley Professional. Mar. 21, 2003.*
Shanley, Tom. Mindshare, Inc. "Infiniband Network Architecture" Addison Wesley Professional. Oct. 31, 2002.*

* cited by examiner

*Primary Examiner*—Huy D Vu
*Assistant Examiner*—Stephen J Clawson
(74) *Attorney, Agent, or Firm*—Dillon & Yudell LLP

(57) ABSTRACT

A system, method, and computer-readable medium for detecting errors on a network. According to a preferred embodiment of the present invention, a network error manager retrieves a network topology from a master subnet manager, wherein the network includes a collection of devices coupled by a first interconnect type. When a connectivity failure is detected in the first interconnect type, the network error manager receives from the master subnet manager at least one event notification via a second interconnect type. An error log analysis component identifies at least one device among the collection of devices as a possible cause of the connectivity failure in the first interconnect type. The network error manager retrieves events from at least one device among the collection of devices that can influence a state of the first interconnect type.

12 Claims, 6 Drawing Sheets

IMPLEMENTING AN ERROR LOG ANALYSIS MODEL TO FACILITATE FASTER PROBLEM ISOLATION AND REPAIR

BACKGROUND OF THE INVENTION

1. Technical Field

The present invention relates in general to the field of data processing systems. More specifically, the present invention relates to the field of diagnosing problems within data processing system systems.

2. Description of the Related Art

In recent years, hardware and software developers have improved server architectures and designs with the goal of more robust and reliable servers for mission critical networking applications. For example, some server applications require that servers respond to client requests in a highly reliable manner.

Additionally, processors implemented in server computers have substantially improved; where processor speeds and bandwidth greatly exceed the capacity of the input/output interfaces such as industry standard architecture (ISA), peripheral component interconnect (PCI), Ethernet, etc. This capacity inequality limits both server throughput and the speed at which data can be transferred between servers on a network. Different server standards have been proposed to improve network performance. The differing server standard proposals led to the development of the InfiniBand Architecture Specification, which was adopted by the InfiniBand Trade Association in October 2000. InfiniBand is a trademark of the InfiniBand Trade Association.

The InfiniBand Architecture (IBA) specifications define InfiniBand operation but limit the scope of the architecture to functions that can be performed only over the InfiniBand wires. Given that IBA is a clustering fabric, an entity is needed to initialize, configure, and manage the fabric. IBA defines this entity as a "Subnet Manager" (SM), which is tasked with the role of subnet administration. The SM performs its tasks in-band (i.e., over IB links) and discovers and initializes devices (e.g., switches, host adapters, etc.) that are coupled to the IB fabric.

With the IBA's scope limited to in-band functionality only, any failures that result in loss of in-band communications are difficult to diagnose and time intensive to remedy. Some IB vendors have attempted to address this shortcoming in a variety of methods, such as "problem isolation" documents or applications that communicate out-of-band with the SM. These applications provide the user a view of the fabric and, in case of in-band failures, log events that may be useful in determining the cause of the failure. While the latter approach can yield additional failure information, the scope is limited to only the observations of the SM. As cluster sizes increase, a one-sided view of fabric failures makes problem isolation difficult and may require a "process of elimination" technique of determining the cause of failures. A "process of elimination" method is cost-prohibitive, since problem determination entail replacement of non-defective parts. Therefore, there is a need for a system and method for addressing the aforementioned limitations of the prior art in detecting the cause of failure in IB networks.

SUMMARY OF THE INVENTION

The present invention includes a system, method, and computer-readable medium for detecting errors on a network. According to a preferred embodiment of the present invention, a network error manager retrieves a network topology from a master subnet manager; wherein the network includes a collection of devices coupled by a first interconnect type. When a connectivity failure is detected in the first interconnect type, the network error manager receives from the master subnet manager at least one event notification via a second interconnect type. An error log analysis component identifies at least one device among the collection of devices as a possible cause of the connectivity failure in the first interconnect type. The network error manager retrieves events from at least one device among the collection of devices that can influence a state of the first interconnect type.

The above, as well as additional purposes, features, and advantages of the present invention will become apparent in the following detailed written description.

BRIEF DESCRIPTION OF THE FIGURES

The novel features believed characteristic of the invention are set forth in the appended claims. The invention itself, however, as well as a preferred mode of use, further purposes and advantages thereof, will best be understood by reference to the following detailed description of an illustrative embodiment when read in conjunction with the accompanying figures, wherein:

DETAILED DESCRIPTION OF A PREFERRED EMBODIMENT

The present invention includes a system and method for implementing InfiniBand error log analysis model to facilitate faster problem isolation and repair. According to one embodiment of the present invention, an InfiniBand (IB) network includes a Subnet Manager that maintains an accurate topological representation of the network and otherwise oversees network administration. A network error manager periodically interrogates the subnet manager for a topological representation of the network and listens for failure notifications, hereinafter referred to as "events", sent by IB devices that detect an IB communication failure. An "IB device" is any device that either implements the network, is attached to the network by means of utilizing an IB device, or a device that can influence the state of IB devices and the state of the IB network. This includes, but is not limited to: switches, adapters, servers/systems, and power supplies.

The events are forwarded to the network error manager by the subnet manager. Once the network error manager determines that more analysis of a particular event is required, the error manager forwards the event to an error log analysis component. The error log analysis component categorizes each received event into at least one of a collection of event pools. After a predetermined time limit each event pool expires. The error log analysis component analyzes each event in the expired event pool for any correlations and/or relations between the events to enable a user to more accurately and efficiently diagnose failing IB devices within an IB network.

Figure 1:
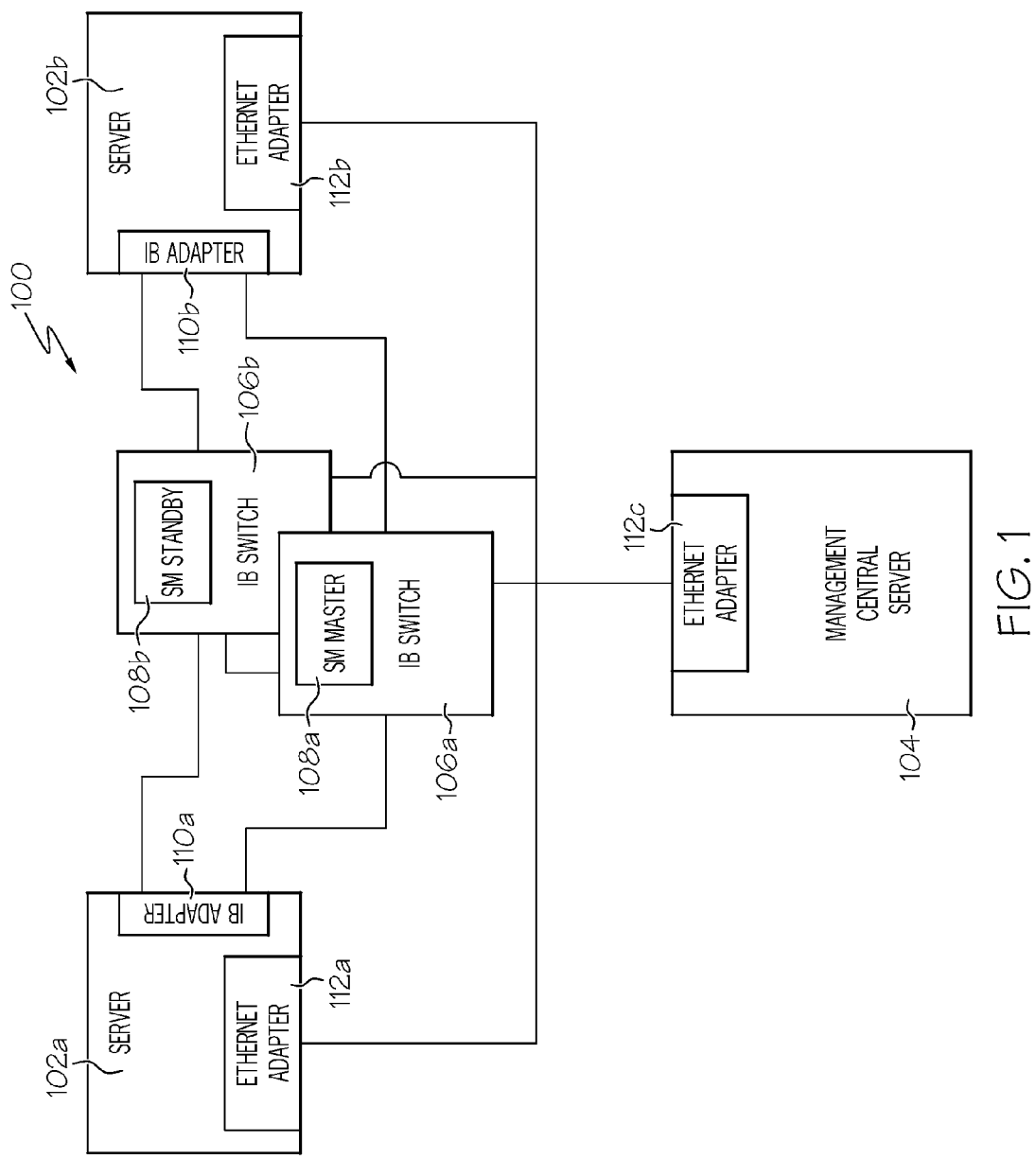
FIG. 1 is a block diagram illustrating an exemplary InfiniBand network in which a preferred embodiment of the present invention may be implemented.

Referring now to the figures, and in particular, referring to FIG. 1, there is illustrated a block diagram depicting an exemplary network 100 in which a preferred embodiment of the present invention may be implemented. As illustrated, network 100 includes servers 102a-b, management central server 104, and InfiniBand (IB) switches 106a-b. Servers 102a-b are coupled to each other via IB switches 106a-b and IB adapters 110a-b. However, servers 102a-b are coupled to management central server 104 via Ethernet adapters 112a-c. As previously discussed, a subnet manager administers the IB connections by discovering and initializing devices (e.g., switches, host adapters, etc.) that are connected to the IB fabric. Therefore, IB switches 106a-b include master subnet manager 108a and standby subnet manager 108b for performing subnet administration. In the event the master subnet manager 108a becomes inoperable, standby subnet manager 108b takes over the responsibilities of administering the IB connections. Those with skill in the art will appreciate that the present invention is not limited to two servers, but may accommodate any number of servers in network 100.

Figure 2:
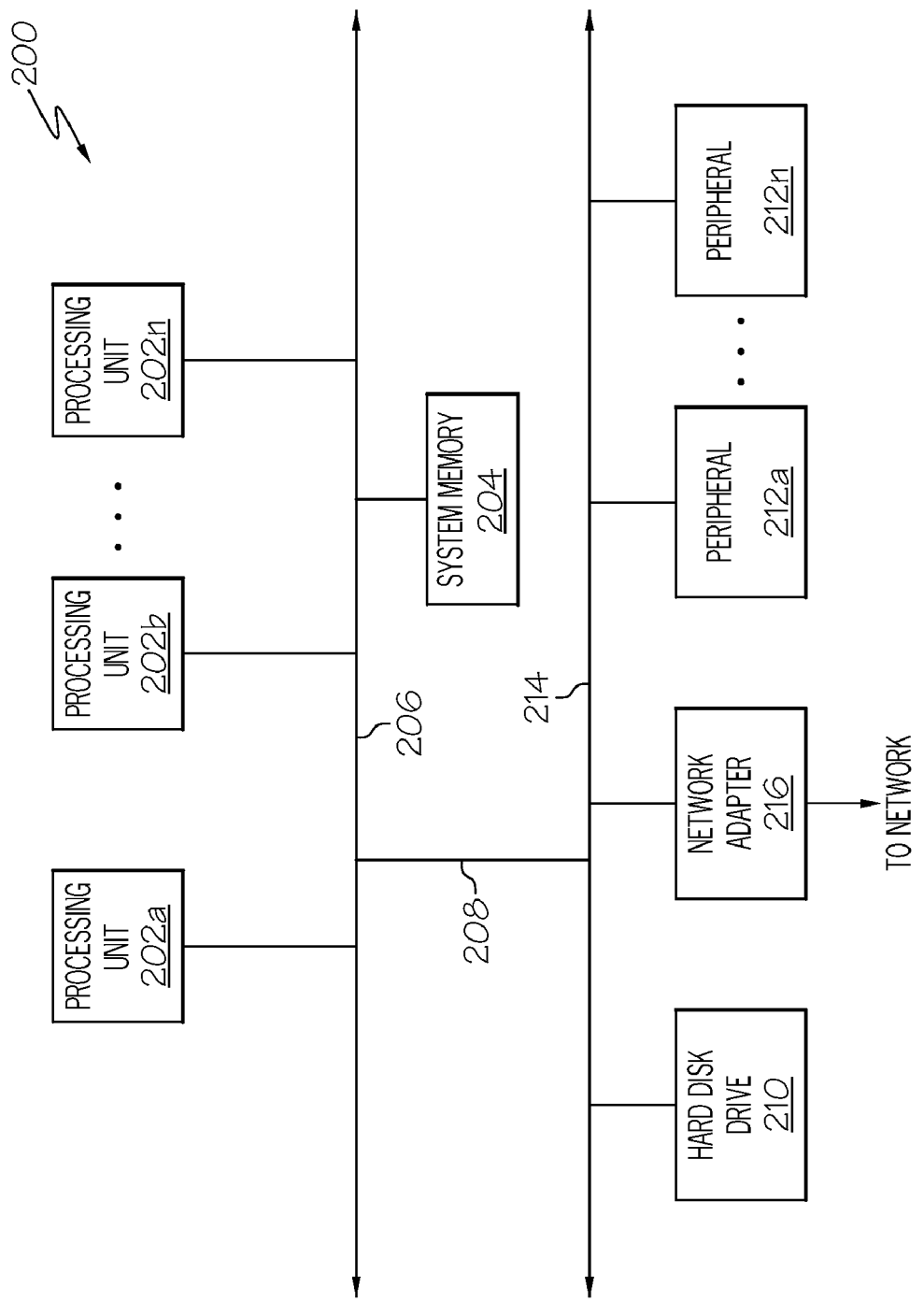
FIG. 2 is a block diagram depicting an exemplary data processing system according to a preferred embodiment of the present invention.

FIG. 2 is a block diagram depicting an exemplary data processing system 200 that may be utilized to implement servers 102a-b and management central server 104 as illustrated in FIG. 1. As depicted, exemplary data processing system 200 includes processor(s) 202a-n, which are coupled to system memory 204 via system bus 206. Preferably, system memory 204 may be implemented as a collection of dynamic random access memory (DRAM) modules. Mezzanine bus 208 acts as an intermediary between system bus 206 and peripheral bus 214. Those with skill in this art will appreciate that peripheral bus 214 may be implemented as a peripheral component interconnect (PCI), accelerated graphics port (AGP), or any other peripheral bus. Coupled to peripheral bus 214 is hard disk drive 210, which is utilized by data processing system 200 as a mass storage device. Also coupled to peripheral bus 214 are network adapter 216 and a collection of peripherals 212a-n. As discussed herein in more detail, network adapter 216 may be implemented by any type of network protocol including, but not limited to, Ethernet, IEEE 802.11x, etc.

Those skilled in the art will appreciate that data processing system 200 can include many additional components not specifically illustrated in FIG. 2. Because such additional components are not necessary for an understanding of the present invention, they are not illustrated in FIG. 2 or discussed further herein. It should be also be understood, however, that the enhancements to data processing system 200 to facilitate faster problem isolation and repair provided by the present invention are applicable to data processing systems of any system architecture. The present invention is in no way limited to the generalized multi-processor architecture or symmetric multi-processing (SMP) architecture illustrated in FIG. 2.

Figure 4:
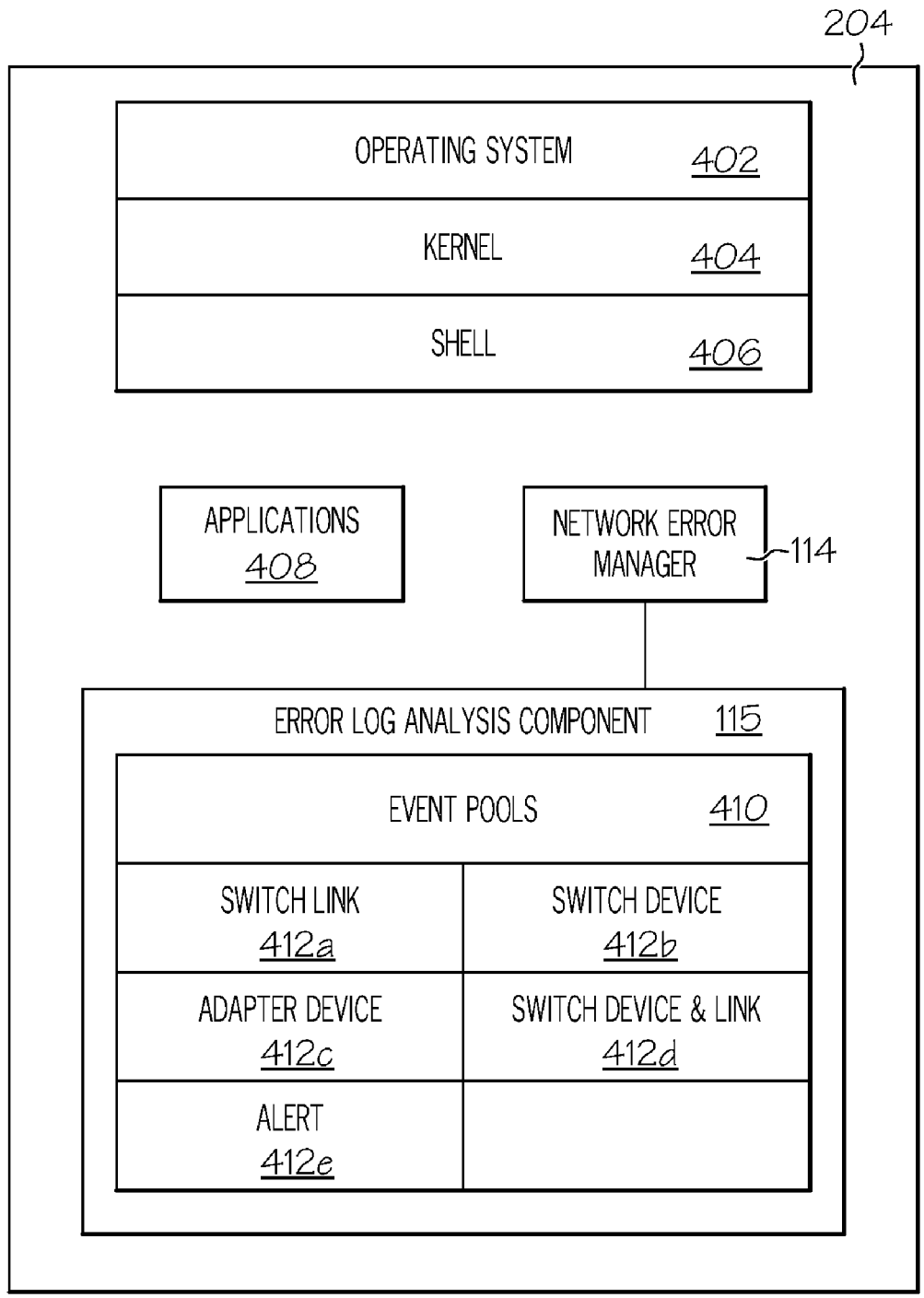
FIG. 4 is a block diagram depicting exemplary contents of a system memory in accordance with a preferred embodiment of the present invention.

FIG. 4 is a block diagram illustrating exemplary contents of system memory 204 of management central server 104 according to a preferred embodiment of the present invention. As illustrated, system memory 204 includes operating system 402, which further includes shell 406 for providing transparent user access to resources such as application programs 408. Generally, shell 406 (as it is called in UNIX®), also called a command processor in Windows®, is a program that provides an interpreter and an interface between the user and the operating system. More specifically, shell 406 executes commands that are entered into a command-line user interface or file. Thus, shell 406 is generally the highest level of the operating system hierarchy and serves as a command interpreter. Shell 406 provides a system prompt, interprets commands entered by keyboard, mouse, or other user input media, and sends the interpreted command(s) to the appropriate lower levels of the operating system (e.g., kernel 404) for processing. Note that while shell 404 is a text-based, line-oriented user interface, the present invention will support other user-interface modes, such as graphical, voice, gestural, etc. equally well.

As depicted, operating system 402 also includes kernel 404, which includes lower levels of functionality for operating system 402, including providing essential services required by other parts of operating system 402 and applications 408, including memory management, process and task management, disk management, and mouse and keyboard management. Applications 408 can include a browser, utilized for access to the Internet, word processors spreadsheets, and other applications. Also, as illustrated in FIG. 4, system memory 204 includes network error manager 114 and error log analysis (ELA) component 115, both of which are discussed herein in more detail.

Network error manager 114, stored within system memory 204 of management central server 104 communicates with master subnet manager 108a to obtain views of the IB topology as the topology is discovered by master subnet manager 108a. Also, since management central server 104 is coupled to servers 102a-b via Ethernet connections, network error manager 114 also collects information from each server 102a-b pertaining to their respective IB adapters 110a-b. During operation, an IB failure may result in loss of in-band IB connectivity and multiple IB devices may observe a failure and report to the active subnet manager (e.g., master subnet manager 108a or standby subnet manager 108b). The active subnet manager forwards the events to network error manager 114 via the Ethernet connection. The ability of Network error manager 114 to obtain events from all affected IB devices via the active subnet manager enables the network error manager 114 and error log analysis component 115 to more accurately and efficiently determine the root cause of the failure. An accurate diagnosis of the root cause of the failure allows a user or repair personnel to order replacement parts for only the failing devices. Also, repair time is greatly reduced since typical "process of elimination" diagnosis is not necessary utilizing the present invention. In one embodiment of the present invention, some devices (e.g., IB adapters 110a, etc.) within network 100 may be field replaceable units (FRUs), which may be replaced by either a user or a technician on-site, without requiring the server to be returned to the vendor for the repair.

Network error manager 114 further receives events from the servers. These events describe state changes in the server that can, in turn, result in state changes in the IB network. While network error manager 114 and error log analysis component 115 are not responsible for the callout of such events, these events may be utilized to modify analysis of IB network events. As such, network error manager 114 and error log analysis component 115 can be considered to be alerted to such events, which will be subsequently described as "alerts".

Network error manager 114 works in conjunction with error log analysis (ELA) component 115 to gather network-wide asynchronous failure notifications ("events"), perform a first level of analysis per event, and pass important events to ELA component 115 for a final analysis of the event relative to how the particular event correlates to other detected events that may affect network operation. While this embodiment does not include events from software or firmware that is critical to InfiniBand network operation, network error manager 114 may be configured to include such events to notify users of software or firmware errors.

To perform the first level of analysis, network error manager 114 interrogates the received events and determines if more data is required to classify the event. Such data may include, but is not limited to, further information regarding potential field replaceable units (FRUs), a time out value (when the event is set to expire), or location information that clarifies the location of the failure. In an embodiment of the present invention, network error manager 114 may apply a threshold to an event to throttle reporting to ELA component 115 by network error manager 114 because certain events are more important based on their frequency of occurrence rather than each individual occurrence. Such a threshold may include a minimum number of events of a certain type that must occur before network error manager 114 reports that type of event to ELA component 115.

Network error manager 114 reports the type of event, the detector's location, and location information to ELA component 115. The location information includes all required information to identify all the potential FRUs related to the event. Such FRU location information may include, but is not limited to: (1) logical FRU location; (2) physical FRU location; (3) machine type, model, and serial number of the enclosure that contains the device; (4) machine type, model, and serial number of power enclosure that is critical to providing power and servicing the device; (5) part number; and (6) part serial number. The location information given must be detailed enough to define a useful hierarchy of device and/or component containers. For example, a device can be contained within a frame that has power that influences the device, as well as a chassis that affects the logic function and power for the device, and it may further be considered a part of a particular network of devices. In one embodiment, the logical FRU location includes fields that enumerate the network, frame, chassis, board, and port associated with the reporting device and event on the device.

In one embodiment, there are three classes of FRUs that may be reported. Because ELA component 115 is concerned with analyzing events, the classes of FRUs are based on their location relative to the device that detected the particular event. The main division point between classes is the connection between two ports in network 100. However, one embodiment could include the possibility of an event from the interface of any connection method between two distinct FRUs. There is a local FRU location list that lists all locations on the same side of a connection with respect to the device that detected the event. There is a remote FRU list for all locations on the opposite side of a cable/connection with respect to the device that detected the event. Also, there is a repeater FRU list that lists all locations between the two ends of a cable/connection with respect to the device that detected the event.

When an event is reported to ELA component 115, each event is categorized into one of several event pools 410 that are utilized to relate events by location and type. As shown in FIG. 4, event pools 410 include, but are not limited to the following pools: switch link 412a, switch device 412b, adapter device 412c, switch device and link 412d, and alert 412e.

Switch link events, categorized in switch link 412a, all occur on a switch link, which can be either between two switches or between an adapter and a switch. These events involve a connection of some sort between two device ports. Network error manager 114 must supply at least the local and remote FRU list information. If there are repeaters between both ports, information regarding these repeaters must be supplied to ELA component 115.

Switch device and adapter device events, categorized in switch device 412b and adapter device 412c, are similar in that they involve events that are related only to the device that is reporting the event. Network error manager 114 must supply the local FRU list information associated with the device.

Switch device and link events, categorized in switch device and link 412d, indicate that the detecting FRU may be defective, but the detecting FRU affects the state of one or more links and may cause events to be reported by the other side of the link.

Alert events, categorized in alert 412e, are those for which ELA component 115 is not responsible for reporting as serviceable, but are important in that the alert event may induce network events. Alert events are utilized to suppress the reporting of network events as serviceable. A "serviceable event" is an event that may be addressed via replacing FRUs by a user or an on-site technician.

The main purpose of the event pools is to keep similar events together so that they may be properly correlated. The pools may be considered a first-level analysis of correlation. The one exception to this rule is the alert event, whose events can be correlated across all of the pools.

After a predetermined period of time, a pool "times out" (expires), or no longer accepts new events in order for ELA component 115 to make correlations between collected events within the pool. There are two trigger mechanisms utilized to control when each pool expires. The "fast" mechanism is defined such that the timeout for the pool is based on a timeout value for the first event in the pool. The "slow" mechanism is defined such that the time out for the pool is based on a timeout value for the latest event to arrive in the pool.

The fast mechanism can suffice for many event relationships. However, the slow mechanism is utilized when there may be a large variance in the time influence of a particular event. Along with the slow mechanism, there is a defined maximum time for a pool to remain open. This defined maximum time is utilized to circumvent the possibility of a pool remaining open indefinitely. The maximum time value is chosen based on the events characteristics of network 100. If the maximum time value is too short, correlation between events may be lost. This would result in events being reported as serviceable when they should not be considered serviceable. In turn, this would result in replacement of non-faulty FRUs. If the chosen maximum value is too long, it may take an inordinate amount of time to report a serviceable event, which can compromise the performance of network 100.

Finally, the alert pool operates slightly differently in that each event times out individually rather than as a group in the entire alert pool, which takes into account the special influence that alert events have on other events. Non-alert pools remain open based on the timeout value and trigger characteristics of the events that are placed within the pool. Once a pool times out, all of the events within the particular pool are compared with one another to determine if and how they relate to each other. The timeout value must take into account latencies for event reporting and event influence. Events may take varying amounts of time to be transferred to ELA component 115. Furthermore, the influence of one event to another event may not be immediate, so any delayed reactions must be taken into account in the chosen timeout value for a particular pool.

There are several characteristics that describe to ELA component 115 how a particular event relates to other events in network 100:

(1) Correlation by location, which can be either local or remote locations.

(2) Scope of influence, which is utilized to describe how many locations a specific event may affect.

(3) Timeout value of a particular event, which influences how long a pool can stay open before being analyzed.

(4) Timeout trigger of an event, which influences how long a pool can stay open before being analyzed.

(5) Priority, which, in absence of other correlation techniques, is utilized as a final arbiter to decide which of a group of events reported from the same device has priority to be reported. This minimizes the possibility of multiple events with the same suggested service action.

(6) Time of reporting, which the earliest reported event takes precedence over any failure notification of equal priority at the same location.

Correlation by location is performed based on locality of devices relative to the reporting device. Local correlation is performed relative to devices on the same side of a cable or other connection mechanism as the reporting device. Remote correlation is performed relative to devices on the opposite side of a cable or other connection mechanism as the reporting device. Each characteristic is simply a list of events that are to be tested for correlation.

The correlation by location is tightly tied to the scope of influence. The scope of influence characteristic indicates at what level within a location's scope an event has influence. For example, a board failure may affect multiple ports on that board. Thus, the event associated with such a board failure must be characterized as having a scope of influence that includes the entire board.

For local correlation, the local FRU list supplied by network manager 114 is tested with respect to scope of influence to see if two events correlate. For example, assume that a first event includes the following features:

(1) The first event lists a second event in its local correlation characteristic;

(2) The first event has a scope of influence at the port level in a computer system; and (3) Both the first event and the second event are categorized in the same event pool.

If both the first event and the second event correlate to the same location from the highest level in the location hierarchy down to the port level, then the first event will suppress the reporting of the second event as a serviceable event. However, the second event still has the opportunity to suppress the reporting of any events of which it has correlation by location and scope of influence. Thus, the ability to analyze a chain reaction is maintained.

Remote correlation is similar to local correlation. However, instead of comparing the local FRU lists for both events, remote correlation compares the remote FRU list for the first event with the local FRU list for the second event, and the local FRU list for the first event with the remote FRU list for the second event. This comparison of locations is also done under the scope of influence characteristic defined in the first event.

For example, assume the first event has the following features:

(1) The first event lists the second event in its local correlation characteristic;

(2) The first event has a scope of influence down to the board level; and (3) Both the first event and the second event are categorized in the same event pool.

If both the first event and the second event correlate to the same location from the highest level in the location hierarchy down to the board level, then the first event will suppress the reporting of the second event. If after all correlations are made and there remain multiple events reported by the same device, a priority comparison is made. The event with the higher priority is reported and the other is suppressed.

Finally, it is important to remember that events are correlated not only based on the relation of types of events and their locality, but also based on when they occurred in time. Two events that occur hours apart are not likely to be related. However, two events that occur within seconds are much more likely to be related. To that end, each event is assigned a timeout value that indicates how long it should be kept in the pool before being reported. During the time that the event is in the pool, it can be related to other events based on correlation and priority characteristics. If it is not suppressed during the timeout period, then it will be reported as a serviceable event.

Once ELA component 115 has a serviceable event to open, the ELA component 115 calls another method to open the event into a tracking database that presents the serviceable events to users. This tracking database allows users to see currently open and closed events, and to indicate what types of actions the users have taken with respect to resolving a serviceable event. Finally, when the user is satisfied, the user may close the particular event.

Figure 3:
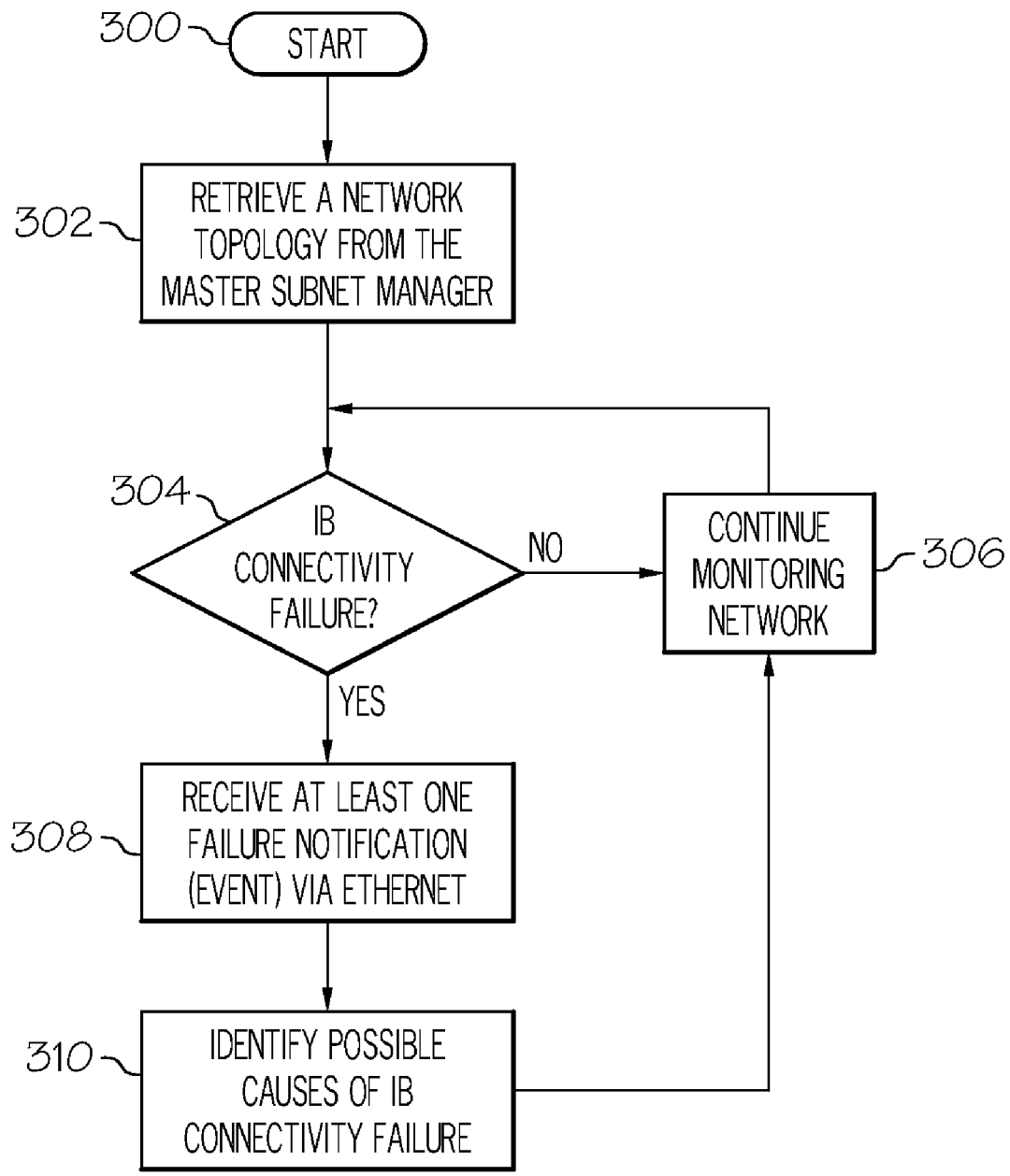
FIG. 3 is a high-level logical flowchart illustrating an exemplary method for implementing InfiniBand error log analysis model to facilitate faster problem isolation and repair according to a preferred embodiment of the present invention.

FIG. 3 is a high-level logical flowchart illustrating an exemplary method for implementing InfiniBand (IB) error log analysis model to facilitate faster problem isolation and repair according to a preferred embodiment of the present invention. The process begins at step 300 and proceeds to step 302, which illustrates network error manager 114 receiving a topology of network 100 from master subnet manager 108*a*. In the event that master subnet manager 108*a* becomes unavailable, standby subnet manager 108*b* takes over the responsibilities of master subnet manager 108*a*.

The process continues to step 304, which illustrates a determination made by at least one IB device (e.g., IB adapter 110*a-b*, IB switch 106*a-b*, etc.) if there is a loss of IB connectivity. If there is no loss of IB connectivity, network manager 114 continues monitoring network 100, as depicted in step 306. The process returns to step 304 and continues in an iterative fashion.

Returning to step 304, if at least one IB device detects a loss of IB connectivity, at least one connectivity event is sent by each IB device that detects loss of IB connectivity via Ethernet adapters 112*a-b*. The at least one connectivity event is received by network error manager 114 via Ethernet adapter 112*c*, as illustrated in step 308. Network manager 114 identifies possible causes of the IB connectivity failure, as illustrated in step 310. The process returns to step 306 and proceeds in an iterative fashion.

Figure 5A:
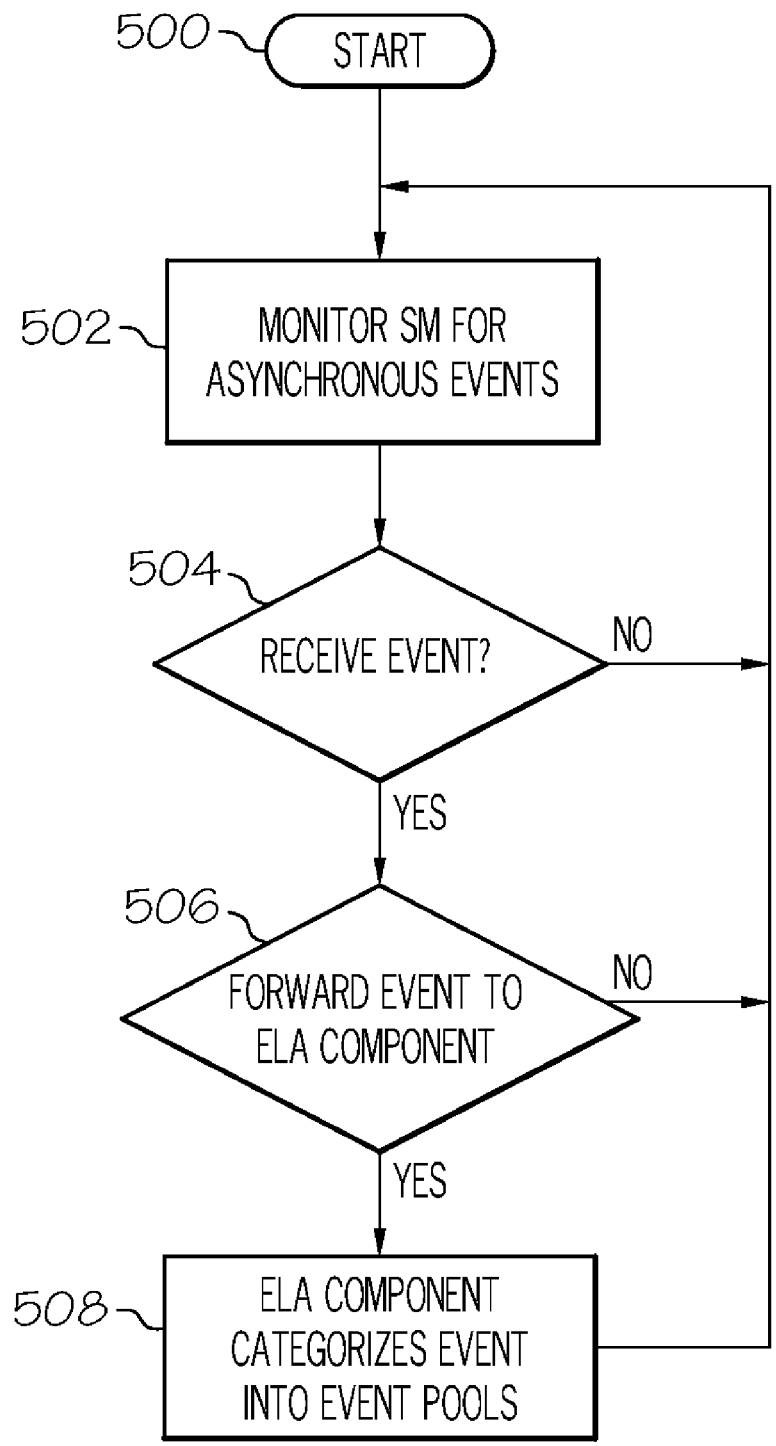
FIGS. 5A-5B are high-level logical flowcharts illustrating more detailed steps within an exemplary method for implementing InfiniBand error log analysis model to facilitate faster problem isolation and repair according to a preferred embodiment of the present invention

FIG. 5A is a high-level logical flowchart that depicts step 308 of FIG. 3 in more detail in accordance with a preferred embodiment of the present invention. The process begins at step 500, and proceeds to step 502, which illustrates network error manager 114 monitoring the active subnet manager for asynchronous events sent from devices within network 100 that have detected communication failures within the network. The process continues to step 504, which illustrates network error manager 114 determining if an event has been received. If an event has not been received, the process returns to step 502 and continues in an iterative fashion. If an event has been received, the process proceeds to step 506, which shows network error manager 114 determining whether the event should be forwarded to ELA component 115. As previously discussed, network error manager 114 makes this determination by requesting more information regarding the event, if needed and analyzing the frequency of the event. If network error manager 114 decides not to forward the event to ELA component 115, the event is discarded, the process returns to step 502 and proceeds in an iterative fashion. If network error manager 114 decides to forward the event to ELA component 115, the event is forwarded and ELA component 115 categorizes the received event into an event pool. The process returns to step 502 and proceeds in an iterative fashion.

Figure 5B:
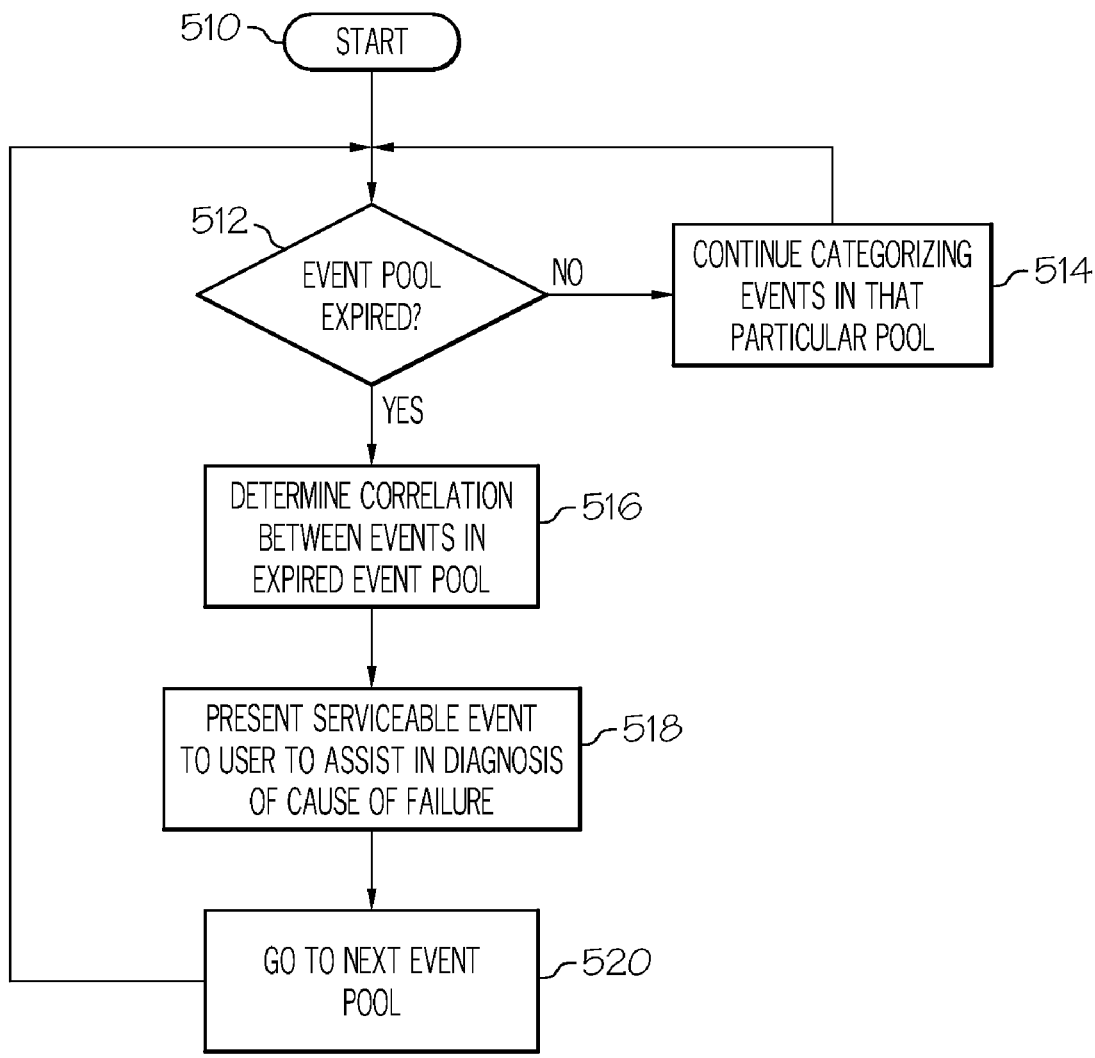

FIG. 5B is a high-level logical flowchart that shows step 310 of FIG. 3 in more detail in accordance with a preferred embodiment of the present invention. Step 310 illustrates the identification of the possible cause of IB failure within network 100. The process begins at step 510 and proceeds to step 512, which illustrates ELA component 115 determining if an event pool has expired (due to the previously discussed predetermined timeout values). If no event pools have expired, the process continues to step 514, which shows ELA component 115 continuing to categorize received events from network error manager 114 into event pools 410. If an event pool has expired, the process continues to step 516, which illustrates ELA component 115 determining if any correlations (location, scope of influence, timeout values, etc.) exist between the events in the expired event pool. The process proceeds to step 518, which depicts ELA component 115 presenting at least one serviceable event (e.g., an event that may be remedied by the user or an on-site technician through the replacement of at least one FRU) to assist in diagnosis of the cause of communication failure. The process continues to step 520, which illustrates ELA component 115 waiting for the next event pool to expire. The process returns to step 512 and proceeds in an iterative fashion.

As discussed, the present invention includes a system, method, and computer-readable medium for detecting errors on a network. According to a preferred embodiment of the present invention, a network error manager retrieves a network topology from a master subnet manager, wherein the network includes a collection of devices coupled by a first interconnect type. When a connectivity failure is detected in the first interconnect type, the network error manager receives from the master subnet manager at least one event notification via a second interconnect type. An error log analysis component identifies at least one device among the collection of devices as a possible cause of the connectivity failure in the first interconnect type. The network error manager retrieves events from at least one device among the collection of devices that can influence a state of the first interconnect type.

It should be understood that at least some aspects of the present invention may alternatively be implemented as a program product. Program code defining functions in the present invention can be delivered to a data storage system or a computer system via a variety of signal-bearing media, which include, without limitation, non-writable storage media (e.g., CD-ROM), writable storage media (e.g., hard disk drive, read/write CD-ROM, optical media), system memory such as, but not limited to Random Access Memory (RAM), and communication media, such as computer and telephone networks including Ethernet, the Internet, wireless networks, and like network systems. It should be understood, therefore, that such signal-bearing media when carrying or encoding computer-readable instructions that direct method functions in the present invention represent alternative embodiments of the present invention. Further, it is understood that the present invention may be implemented by a system having means in the form of hardware, software, or a combination of software and hardware as described herein or their equivalent.

While the present invention has been particularly shown and described with reference to a preferred embodiment, it will be understood by those skilled in the art that various changes in form and detail may be made therein without departing from the spirit and scope of the invention.

What is claimed is:

1. A method for detecting errors in a network, said method comprising:

retrieving, using a network error manager, a network topology from a master subnet manager residing in a network switch, wherein said network includes a plurality of devices coupled by a first interconnect type;

when a connectivity failure is detected from within said first interconnect type by at least one device included in said plurality of devices, receiving by said network error manager from said master subnet manager at least one event notification via a second interconnect type;

retrieving, by said network error manager from said master subnet manager, events from said at least one device among said plurality of devices that can influence a state of said first interconnect type;

reporting said retrieved events associated with said at least one event notification to an error log analysis component;

categorizing, using said error log analysis component, said reported events into event pools that are utilized to relate said reported events by location and type;

correlating, using said error log analysis component, said reported events categorized in said event pools to determine how said reported events are related; and identifying, using said error log analysis component and based on said correlating, at least one device among said plurality of devices as a possible cause of said connectivity failure in said first interconnect type.

2. The method according to claim 1, wherein said second interconnect type is an Ethernet network.

3. The method according to claim 1, further comprising: detecting changes in said network topology.

4. The method according to claim 1, further comprising: replacing said master subnet manager with a standby subnet manager if said master subnet manager becomes unavailable.

5. A system for detecting errors on a network, wherein said network includes a plurality of devices coupled by a first interconnect type, said system comprising:

a master subnet manager, residing in a network switch, for managing a network topology of said network;

a network error manager for:

retrieving a network topology from said master subnet manager residing in a network switch;

receiving from said master subnet manager at least one event notification via a second interconnect type, when a connectivity failure is detected from within said first interconnect type by at least one device included in said plurality of devices;

retrieving events from said at least one device among said plurality of devices that can influence a state of said first interconnect type; and an error log analysis component for identifying at least one device among said plurality of devices as a possible cause of said connectivity failure in said first interconnect type, wherein said error log analysis component is configured to categorize events reported by said network error manager into event pools that are utilized to relate said reported events by location and type and correlate said reported events categorized in said event pools to determine how said reported events are related and to identify at least one device as said possible cause of said connectivity failure in said first interconnect type, and wherein said network error manager and said error log analysis component are implemented as one or more programmed processing units.

6. The system for detecting errors on a network according to claim 5, wherein said second interconnect type is an Ethernet network.

7. The system for detecting errors on a network according to claim 5, wherein said network error manager detects changes in said network topology.

8. The system for detecting errors on a network according to claim 5, further comprising:

a standby subnet manager for replacing said master subnet manager if said master subnet manager becomes unavailable.

9. A computer-usable storage medium embodying computer program code, said computer program code comprising computer-executable instructions configured for:

retrieving, using a network error manager, a network topology from a master subnet manager residing in a network switch, wherein said network includes a plurality of devices coupled by a first interconnect type;

when a connectivity failure is detected from within said first interconnect type by at least one device included in said plurality of devices, receiving by said network error manager from said master subnet manager, at least one event notification via a second interconnect type;

retrieving, by said network error manager from said master subnet manager, events from said at least one device among said plurality of devices that can influence a state of said first interconnect type;

reporting said retrieved events associated with said at least one event notification to an error log analysis component;

categorizing, using said error log analysis component, said reported events into event pools that are utilized to relate said reported events by location and type;

correlating, using said error log analysis component, said reported events categorized in said event pools to determine how said reported events are related; and identifying, using said error log analysis component and based on said correlating, at least one device among said plurality of devices as a possible cause of said connectivity failure in said first interconnect type.

10. The computer-usable storage medium embodying computer program code according to claim 9, wherein said second interconnect type is an Ethernet network.

11. The computer-usable storage medium embodying computer program code according to claim 9, wherein said computer program code further comprises computer-executable instructions configured for:

detecting changes in said network topology.

12. The computer-usable storage medium embodying computer program code according to claim 9, wherein said computer program code further comprises computer-executable instructions configured for:

replacing said master subnet manager with a standby subnet manager if said master subnet manager becomes unavailable.

\* \* \* \* \*